Figure 1:
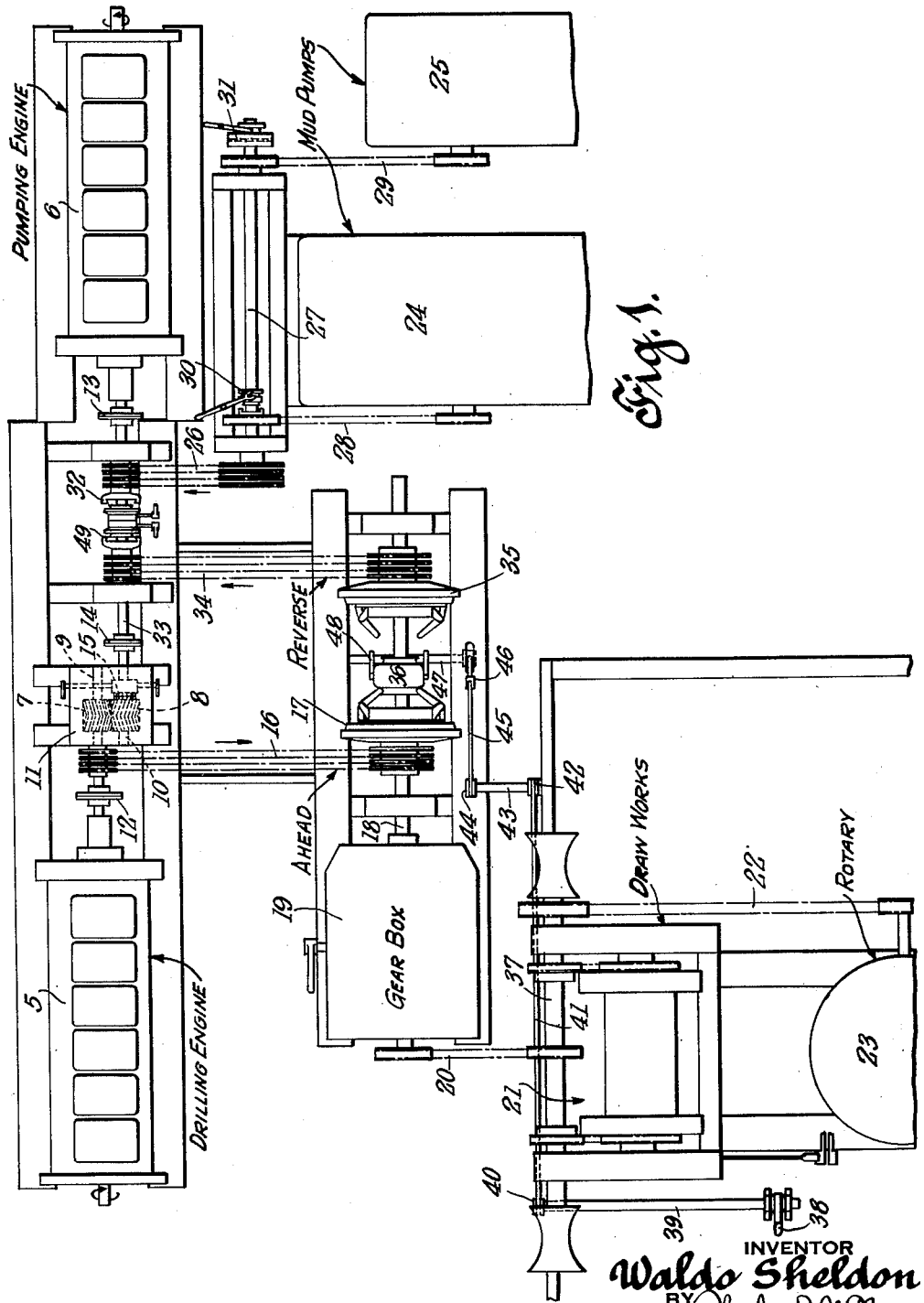

Nov. 17, 1931.  W. SHELDON  1,832,841

WELL DRILLING APPARATUS

Filed Jan. 27, 1931  2 Sheets-Sheet 1

INVENTOR
Waldo Sheldon
BY
ATTORNEY

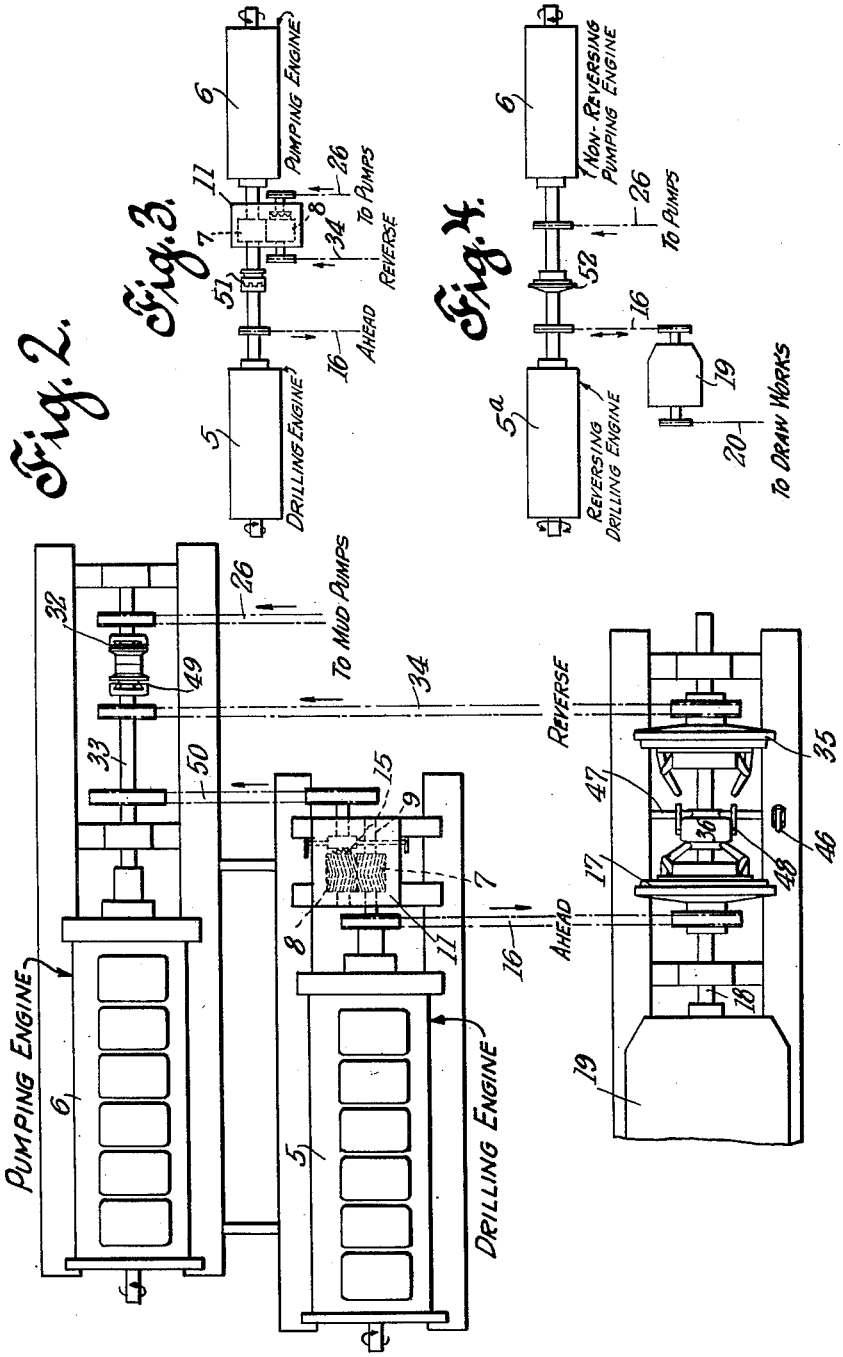

Patented Nov. 17, 1931

1,832,841

UNITED STATES PATENT OFFICE

WALDO SHELDON, OF SOUTH NORWALK, CONNECTICUT

WELL DRILLING APPARATUS

Application filed January 27, 1931. Serial No. 511,457.

In the operation of rotary drilling machines with internal combustion engines, it has been the practise to provide a special planetary gear form of reverse clutch for effecting the reverse drive of the parts. These clutches are complicated, heavy, cumbersome and expensive. In addition, the planetary gear mechanism gives trouble and effects a reduction in speed in the reverse rotation which is not desirable.

The important objects of the present invention are to eliminate the need for this reversing clutch and to provide simplified, reliable and practical mechanism for effecting the reverse drive.

These objects are attained in part, by using a reversely driving engine for supplying the power for the reverse drive.

Other special novel features of the invention are the use of a pumping engine separate from the drilling engine and the provision of gearing for coupling this pumping engine in reversely driving relation to the rotary machine; the provision of means for enabling the coupling of the pumping engine to the drilling engine in a manner to supplement the power of the latter; and the arrangement of the power plants in such manner that they either, or both, may be utilized on occasion to drive either, or both, the rotary and the pumps.

Other novel and important features of the invention will appear as the specification proceeds.
The drawings accompanying and forming part of the specification illustrate certain practical embodiments of the invention, but it will be appreciated that the structure may be modified as regards these particular disclosures, without departure from the true spirit and broad scope of the invention.

Fig. 1 is a broken plan view illustrating somewhat diagrammatically one of the present preferred embodiments of the invention;
Figs. 2, 3 and 4 are similar views illustrating other possible variations of the power plant arrangements.

In the several views, the drilling engine is designated 5 and the pumping engine 6. For the sake of ready interchangeability, these may be duplicate engines, each turning in the same direction, as in Fig. 1 and they may be Diesel or any other type.

In Fig. 1, the two engines are shown as mounted in end-to-end relation, but offset for coupling them in power-adding connection through intermeshing gears 7, 8 on shafts 9, 10, in a gear box 11, located between the adjoining ends of the engines. The crank shafts of the respective engines are shown as connected with these gear shafts through flexible couplings 12, 13, 14, to aid in synchronization of the two engines and clutch mechanism is shown at 15 for controlling this power coupling relation between the two engines.

The drive from the two engines to the rotary and to the pumps may be by sprocket chains, multiple-rope, belt or gears.

In the illustration, multiple chain drive 16 is provided from the drilling engine to a forward drive clutch 17, on shaft 18, operating into a change-speed gear set 19, from which the drive is by sprocket chain gearing 20 to the draw-works 21 and by sprocket chain drive 22 to the rotary 23.

The drive from the pumping engine to the mud pumps 24, 25, is shown as accomplished by multiple chain drive 26 from the engine shaft to a counter shaft 27 and from the latter by chain drives 28, 29, to the respective pumps under control of independently operable clutches 30, 31.

The pump drive as a whole is under control of a jaw clutch 32 on the shaft extension 33 of the pumping engine.

The reverse drive is effected in Fig. 1 by multiple chain connections 34 from the extension shaft of the pump engine to a reverse drive clutch 35 on the clutch shaft 18.

Because of the back-to-back relation of the engines, it will be seen that with both engines turning right-handedly in the illustration, the "ahead" clutch will be driven in one direction and the reverse clutch in the opposite direction. Consequently, the clutch shaft 18 and transmission gearing will be run one way for forward drive and the opposite way for reverse rotation of the draw works and rotary.

To enable quick change from one direction to the other, the "ahead" and reverse clutches are shown as having a common actuator 36 movable on the clutch shaft, toward the left to set the "ahead" clutch and toward the right to set the reverse clutch and further that the release of one clutch will be effected before the other clutch is set.

The gear box 19 may be of any standard design to provide two or more speeds and where the rotary is driven direct from the cathead shaft 37 as illustrated in Fig. 1, these speeds will be effective for the rotary, when, as shown, the cathead shaft is directly driven from the gear box.

The "ahead" and reverse clutches are shown as controlled from a convenient station at the draw works by means of a hand lever 38 on shaft 39, carrying an arm 40 connected by link 41 with one arm 42 on a rock shaft 43 carrying another arm 44 connected by link 45 with the arm 46 on a rock shaft 47 carrying arms 48 engaged with the reversely shiftable clutch setting device 36.

A jaw clutch 49 on the pump engine shaft extension enables the reverse clutch member either to be kept turning idly ready for instant use, or to be entirely cut out, as may be desired. Thus with clutch 49 engaged, an instant change-over from forward to reverse drive may be effected by simply throwing lever 38 to the right in Fig. 1, to release the "ahead" clutch and to close the reverse clutch. Clutch 49 however, may be left open during ordinary drilling operations to leave the pumping engine connected only with the pumps.

Also, it will be understood, that during a period of ordinary drilling operations, the clutch 15 in the compounding gear box may be left open, so that the two engines will be operating independently of each other.

For compounding or adding the power of one engine to the other, as may be desired for hoisting out of the hole, the clutch 15 will be engaged and the two engines will be then directly coupled together, both giving their power to the work at hand. It will be noted that this double power may be used either for forward or reverse drive, depending upon whether the "ahead" or reverse clutch is engaged, the drive in the first instance being through chains 16, or in the second instance, through chains 34 and in each of such events, the gears 7, 8, adding the power of one engine to that of the other. If, for any reason, it be necessary to use the combined power of the two engines on the pumps, this may be accomplished by leaving the clutch control 36 in the intermediate neutral position, with both "ahead" and reverse clutches "out" or "open".

The main pump drive clutch 32 provides a control by which the pumps can be maintained in service, while the pumping engine is used for reverse drive or for adding its power to the forward drive, or can be cut out of operation during such times.

Substantially the same results may be accomplished by having reversely running engines as shown in Fig. 2, where the drilling engine 5 is indicated as a right-handed engine and the pumping engine 6 as a left-handed engine. These two engines are shown as disposed in parallel side-by-side relation, with a power connection 16 from the drilling engine to the "ahead" clutch and a power connection 34 from the pumping engine to the reverse clutch. The pump engine, as in the first illustration, has a drive connection 26 to the pumps and clutches 32 and 49 on the pump engine shaft extension 33, enabling independent control of the pump drive and the reverse drive.

The shift from "ahead" to reverse may be effected in Fig. 2, the same as in Fig. 1, by simply throwing out the "ahead" clutch 17 and cutting in the reverse clutch 35.

The power-adding gear box 11 in this second illustration, is shown as mounted directly on the base of the drilling engine and with the second gear 8 connected with the pumping engine by sprocket chain connections 50. This gives the proper direction of rotation, enabling the two engines to be coupled together for compounding the power either for drilling or for pumping purposes.

In Fig. 3, two reversely running engines are disposed in direct end-to-end relation with a power combining clutch 51 on the aligned shafting of the two engines and the mud pumps and the reverse clutch are given the proper direction of rotation from the reversing gears 7, 8, connected with the pumping engine shaft.

It is also possible to use a combination of reversible drilling engine 5a and non-reversible pump engine 6 as shown in Fig. 4. The reversible engine may be one of the so-called "air-reversing" Diesel engines and in this case, this engine is directly connected to the change speed gear box through a clutch such as designated 17. This engine can be stopped and then run in the opposite direction for reverse drive purposes and the non-reversing pump engine may be direct connected for power compounding purposes with the shaft of the reversible engine through a suitable friction clutch 52.

As compressed air is usually available for starting purposes with internal combustion engines, such as used in the oil fields, the operation of the clutches may be effected by compressed air devices and the connections for such devices be led through suitable piping to suitable controls at the drillers station, eliminating the need for extensive mechanical connections.

What is claimed is:

1. In well drilling apparatus the combination of a rotary and pump mechanism, a drilling engine for operating the rotary, a separate engine for operating the pump mechanism, power connections from the drilling engine to the rotary and from the pumping engine to the pump mechanism and means for connecting the pumping engine in reverse driving relation to the rotary.

2. In well drilling apparatus, the combination of a rotary and pump mechanism, a drilling engine for operating the rotary, a separate engine for operating the pump mechanism, power connections from the drilling engine to the rotary and from the pumping engine to the pump mechanism, means for connecting the pumping engine in reverse driving relation to the rotary including "ahead" and reverse clutches arranged respectively to effect the "ahead" and reverse drive of the rotary.

3. In well drilling apparatus, the combination of a rotary and pump mechanism, a drilling engine for operating the rotary, a separate engine for operating the pump mechanism, power connections from the drilling engine to the rotary and from the pumping engine to the pump mechanism, means for connecting the pumping engine in reverse driving relation to the rotary and means for coupling the engines in power compounding relation.

4. In well drilling apparatus, the combination of a rotary and pump mechanism, a drilling engine for operating the rotary, a separate engine for operating the pump mechanism, power connections from the drilling engine to the rotary and from the pumping engine to the pump mechanism, means for connecting the pumping engine in reverse driving relation to the rotary, means for coupling the engines in power compounding relation and including mechanism enabling application of the power in both engines to the drill or to the pump mechanism.

5. In well drilling apparatus, the combination of a rotary and pump mechanism, a drilling engine for operating the rotary, a separate engine for operating the pump mechanism, power connections from the drilling engine to the rotary and from the pumping engine to the pump mechanism, means for connecting the pumping engine in reverse driving relation to the rotary and including "ahead" and reverse clutches interposed in the power connections from the drilling engine and pumping engine and turning in opposite directions and means for selectively controlling said clutches.

6. In well drilling apparatus, the combination of a drilling engine and a pumping engine, a reverse unit comprising a power take-off shaft and independently engageable "ahead" and reverse clutches thereon, connections from the drilling engine for driving the "ahead" clutch in one direction, connections from the pumping engine for driving the reverse clutch in the opposite direction and drive connections from said power take-off shaft.

7. In well drilling apparatus, the combination of a drilling engine and a pumping engine, a reverse unit comprising a power take-off shaft and independently engageable "ahead" and reverse clutches thereon, connections from the drilling engine for driving the "ahead" clutch in one direction, connections from the pumping engine for driving the reverse clutch in the opposite direction, drive connections from said power take-off shaft and meshed gears connected to provide a power compounding relation of the two engines.

8. In well drilling apparatus, the combination of a drilling engine and a pumping engine, a reverse unit comprising a power take-off shaft and independently engageable "ahead" and reverse clutches thereon, connections from the drilling engine for driving the "ahead" clutch in one direction, connections from the pumping engine for driving the reverse clutch in the opposite direction, drive connections from said power take-off shaft, meshed gears connected to provide a power compounding relation of the two engines and means for controlling the power compounding relation of said gears.

9. In well drilling apparatus, the combination of a drilling engine and a pumping engine, both turning in the same direction, drilling and pumping drive connections from the respective engines and a set of reversely operating drive connections from the pumping engine with control means for substituting the same for the "ahead" drive connections of the drilling engine.

10. In well drilling apparatus, the combination of a drilling engine and a pumping engine, both turning in the same direction, drilling and pumping drive connections from the respective engines, a set of reversely operating drive connections from the pumping engine with control means for substituting the same for the "ahead" drive connections of the drilling engine and controllable power connections for coupling the engines in power compounding relation.

11. In well drilling apparatus, the combination of drilling and pumping engines turning in opposite directions, "ahead" drive connections from the drilling engine, reverse drive connections from the pumping engine, pump drive connections from the pumping engine and selective control mechanism for rendering the reverse drive connections of the pump engine effective in place of the "ahead" driving connections of the drilling engine.

12. In well drilling apparatus, the combination of drilling and pumping engines turning in opposite directions, "ahead" drive connections from the drilling engine, reverse drive connections from the pumping engine, pump drive connections from the pumping engine, selective control mechanism for rendering the reverse drive connections of the pump engines effective in place of the "ahead" driving connections of the drilling engine and controllable means for coupling the engines in power compounding relation.

13. In well drilling apparatus, the combination of a power take-off shaft, "ahead" and reverse clutches on said shaft, separate engines connected for driving said "ahead" and reverse clutches in opposite directions and means for selectively governing the operation of said clutches.

14. In well drilling apparatus, the combination of a power take-off shaft, "ahead" and reverse clutches on said shaft, separate engines connected for driving said "ahead" and reverse clutches in opposite directions, means for selectively governing the operation of said clutches and means for coupling the engines in power compounding relation.

15. Well drilling apparatus, comprising in combination, a rotary machine and draw works with power connections between the same, a reverse unit consisting of a shaft and "ahead" and reverse clutches thereon, power connections from said shaft to the draw works and rotary machine, a drilling engine, drive connections from said drilling engine to the "ahead" clutch, a pumping engine, pump mechanism, drive connections from said pumping engine to said pump mechanism, drive connections from said pumping engine to said reverse clutch for rotating the latter reversely in relation to the "ahead" clutch and means for selectively controlling said "ahead" and reverse clutches.

16. Well drilling apparatus, comprising in combination, a rotary machine and draw works with power connections between the same, a reverse unit consisting of a shaft and "ahead" and reverse clutches thereon, power connections from said shaft to the draw works and rotary machine, a drilling engine, drive connections from said drilling engine to the "ahead" clutch, a pumping engine, pump mechanism, drive connections from said pumping engine to said pump mechanism, drive connections from said pumping engine to said reverse clutch for rotating the latter reversely in relation to the "ahead" clutch, means for selectively controlling said "ahead" and reverse clutches and the power connections from the clutch shaft including a change speed gear set interposed between said shaft and the draw works.

17. Well drilling apparatus comprising in combination, a rotary machine and draw works with power connections between the same, a reverse unit consisting of a shaft and "ahead" and reverse clutches thereon, power connections from said shaft to the draw works and rotary machine, a drilling engine, drive connections from said drilling engine to the "ahead" clutch, a pumping engine, pump mechanism, drive connections from said pumping engine to said pump mechanism, drive connections from said pumping engine to said reverse clutch for rotating the latter reversely in relation to the "ahead" clutch, means for selectively controlling said "ahead" and reverse clutches and clutch means for rendering inoperative the reverse drive connections from the pumping engine.

18. In well drilling apparatus, the combination of a drilling engine and a pumping engine with drill driving connections from the drilling engine and pump driving connections from the pumping engine, reversely driving connections from the pumping engine, means for connecting the same in on the line of drill driving connections and reversely operating gears connectible in power compounding relation between the two engines.

19. In well drilling apparatus, the combination of a reversible internal combustion engine and a non-reversing internal combustion engine, a rotary machine, drive connections from the reversible engine for effecting "ahead" and reverse drive of the rotary machine, pump mechanism, drive connections from the non-reversing engine to the pump mechanism and controllable power compounding connections between the two engines.

In testimony whereof I affix my signature.

WALDO SHELDON.